United States Patent [19]
Wilson et al.

[11] Patent Number: 5,895,582
[45] Date of Patent: Apr. 20, 1999

[54] PROCESS OF MANUFACTURING A GLASS SUBSTRATE FOR A MAGNETIC DISK

[75] Inventors: Christopher John Wilson, North Wales; Paul Andrew Marshall, Chester, both of United Kingdom

[73] Assignee: Pilkington plc, Merseyside, United Kingdom

[*] Notice: This patent is subject to a terminal disclaimer.

[21] Appl. No.: 08/087,339

[22] Filed: Jul. 8, 1993

[30] Foreign Application Priority Data

Jul. 9, 1992 [GB] United Kingdom ............. 9214624
Mar. 29, 1993 [GB] United Kingdom ............. 9306469

[51] Int. Cl.⁶ .................. B44C 1/22; C03C 15/00
[52] U.S. Cl. .................. 216/42; 216/22; 216/41; 216/49; 216/50; 216/97
[58] Field of Search ............... 428/141, 694 ST, 428/694 SG, 64, 65, 66, 64.3, 64.4, 65.3, 64.2; 156/654, 658, 659.1, 660, 663; 427/287, 272, 282, 271, 273; 65/31; 216/22, 24, 31, 40, 41, 42, 49, 54, 55, 97, 98

[56] References Cited

U.S. PATENT DOCUMENTS

| | | | |
|---|---|---|---|
| 4,267,000 | 5/1981 | Dix et al. | 156/235 |
| 4,451,329 | 5/1984 | Batchelor et al. | 156/660 |
| 4,544,443 | 10/1985 | Ohta et al. | 156/643 |
| 4,655,876 | 4/1987 | Kawai et al. | 156/643 |
| 4,797,316 | 1/1989 | Hecq et al. | 428/167 |
| 4,818,648 | 4/1989 | Ohta et al. | 430/17 |
| 4,833,001 | 5/1989 | Kijima et al. | 428/141 |
| 4,869,778 | 9/1989 | Cote | 156/635 |
| 4,983,246 | 1/1991 | Bunting | 156/240 |
| 4,996,622 | 2/1991 | Takatsuki et al. | 360/135 |
| 5,082,709 | 1/1992 | Suzuki et al. | 428/64 |
| 5,087,481 | 2/1992 | Chen et al. | 427/129 |
| 5,093,173 | 3/1992 | Nakagawa et al. | 428/64 |
| 5,131,977 | 7/1992 | Morizane et al. | 156/646 |
| 5,242,544 | 9/1993 | Itoh et al. | 156/659.1 |
| 5,499,731 | 3/1996 | Marshall | 216/22 |

FOREIGN PATENT DOCUMENTS

| | | |
|---|---|---|
| 0228814 | 7/1987 | European Pat. Off. . |
| 0310397 | 4/1989 | European Pat. Off. . |
| 0319350 | 6/1989 | European Pat. Off. . |
| 3824889 | 1/1990 | Germany . |
| 63-086116 | 4/1988 | Japan . |
| 4-113511 | 4/1992 | Japan . |
| 2200595 | 8/1988 | United Kingdom . |
| 2259060 | 3/1993 | United Kingdom . |

OTHER PUBLICATIONS

The Search Report, GB Appliction No. 9214624.0, Oct. 8, 1992.
Patent Abstracts of Japan, Pub. No. JP 3281790.
Derwents Patent Abstracts, Week 8148, Abstract of JP-A-49 128 009.
Patent Abstracts of Japan, vol. 9, No. 304, Nov. 1985, Abstract of JP-A 60 136 035.
Patent Abstracts of Japan, vol. 13, No. 98, Mar. 1989, Abstract of JP 63 279 425.
Patent Abstracts of Japan, vol. 14, No. 389, Aug. 1990, Abstract Jp 2 146 109.
Patent Abstracts of Japan, vol. 13, No. 27, Jan. 1989, Abstract of JP 63 225 919.

*Primary Examiner*—Vivian Chen
*Attorney, Agent, or Firm*—Burns, Doane, Swecker & Mathis LLP

[57] ABSTRACT

The present invention relates to a glass substrate for a thin film magnetic data storage disk and to a process for producing such a glass substrate. The process includes the steps of: (a) providing a glass substrate; (b) printing a regular masking pattern of printed dots onto at least a portion of the surface of the substrate; and (c) etching the unmasked surface of the substrate thereby to texture the substrate surface. The glass substrate for a thin film magnetic data storage disk has a roughened surface produced by preferential area etching, the roughened surface being composed of a regular pattern of peaks separated by valleys.

14 Claims, 3 Drawing Sheets

PROCESS OF MANUFACTURING A GLASS SUBSTRATE FOR A MAGNETIC DISK

BACKGROUND OF THE INVENTION

The present invention relates to a glass substrate for a thin film magnetic data storage disc and to a process for producing such a glass substrate.

Thin film magnetic discs for storing data are known in which a magnetic recording medium has been deposited onto a glass substrate. In use, the magnetic disc is disposed in a magnetic disc drive unit which utilises a magnetic head for reading and writing information from and onto the disc. Prior to the reading and writing operation, the disc is stationary and the head is in contact with the magnetic recording medium on the disc. In the reading and writing operation, the disc is driven to rotate at a predetermined speed relative to the head which can be moved radially relative to the disc. The head is spaced a very small distance from the magnetic recording medium and is adapted to read information from and write information onto the magnetic recording medium at the desired place on the magnetic recording medium. After the reading and writing operation, the rotation of the disc is terminated and the head is permitted to return to the initial configuration wherein the head contacts the disc. This method of operating a disc is known in the art as a contact-start-stop (CSS) method. It is known that such magnetic disc drive units suffer from the problem of "stiction" or static friction which exists between the head and the magnetic recording medium on initiation or termination of the reading or writing operation. This stiction can cause wear of the head and of the medium and thus can reduce the life time of the magnetic disc drive unit. The tendency for stiction to occur increases with increasing smoothness of the magnetic recording medium. Glass is known for use as a substrate for such magnetic discs, although it is also well known to use aluminium discs as the substrate, because glass is hard and has high surface smoothness. However, glass can suffer from the disadvantage that it has such a smooth surface that the overlying magnetic recording medium which has a correspondingly smooth surface is so smooth that the surface area of the medium actually contacting the static recording head is sufficiently large whereby the stiction problem can be encountered during use of the drive unit. This can cause premature failure of the drive unit and/or the media as described above.

It is known from U.S. Pat. No. 4,833,001 to provide a glass substrate for a magnetic disc with an isotropically roughened surface. The surface roughening is achieved by chemical etching of the glass surface either by a gas containing hydrogen fluoride or by an aqueous solution containing a fluorine compound. U.S. Pat. No. 5,087,481 discloses a method for texturing a magnetic disc silicate glass substrate in which prior to surface roughening or "texturing" of the disc, this being achieved by chemical etching, the glass surface is subjected to a chemical or gentle mechanical polishing step to remove microcracks or scratches in the disc surface. However, we have found that the use of chemical etching of the disc surface has the disadvantage that a fully isotropic micro-textured surface can be difficult to achieve.

SUMMARY OF THE INVENTION

The present invention aims to provide a method of producing a glass substrate for a thin film magnetic data storage disc, the glass substrate having a textured or roughened surface, which has advantages over these known processes.

Accordingly, the present invention provides a process for producing a glass substrate for a thin film magnetic data storage disc, the process including the steps of: (a) providing a glass substrate; (b) printing a masking pattern onto at least a portion of the surface of the substrate; and (c) etching the unmasked surface of the substrate thereby to texture the substrate surface.

The present invention further provides a glass substrate for a thin film magnetic data storage disc, the substrate having a roughened surface produced by preferential area etching, the roughened surface being composed of a regular pattern of peaks separated by valleys.

BRIEF DESCRIPTION OF THE DRAWINGS

Embodiments of the present invention will now be described by way of example only, with reference to the accompanying drawings, in which.

DETAILED DESCRIPTION OF THE PREFERRED EMBODIMENTS

Figure 1:
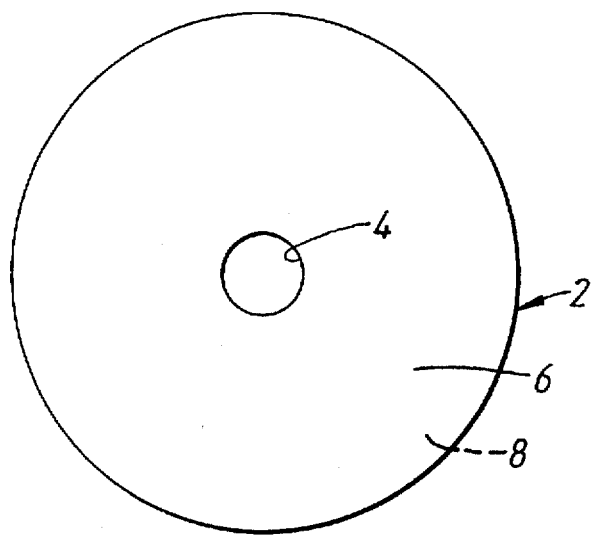
FIG. 1 is a plan view of a glass disc to form a glass substrate for a thin film magnetic data storage disc in accordance with an embodiment of the present invention.

Referring to FIG. 1, there is shown a glass disc 2 having a central circular hole 4 to form a glass substrate for a thin film magnetic data storage disc in accordance with the present invention. The glass disc 2 is typically composed of a soda lime silicate float glass but, alternatively, the glass disc 2 may be composed of a sheet glass. The glass disc 2 may be composed of other glass compositions such as an alkali-containing borosilicate glass, an alkali-containing aluminoborosilicate glass, an alkali-aluminosilicate glass, an alkali-free glass; an air-cooled or liquid-cooled toughened glass, a chemically strengthened or toughened glass or a crystallised glass i.e. a glass ceramic. In this specification, the term "glass" encompasses all of these types of glass or glass ceramics. In accordance with an embodiment of the present invention, typically the glass composition is a standard soda lime silicate float glass composition such as $SiO_2$ 70.5–73.0 wt %, $Al_2O_3$ 0.5–2.0 wt %, CaO 7.5–10.0%, $Fe_2O_3$ 0.05–0.15 wt %, MgO 3.5–5.5 wt %, $Na_2O$ 12.5–15.0 wt %, $K_2O$ 0.05–0.5 wt %.

The initial polished, blemish free, flat and parallel float glass disc typically has a surface roughness average (as hereinafter described) of 0.5 to 1.0 nm. Initially, the glass is polished, for example by a mechanical or chemical polishing process, in order to remove surface damage from the opposed disc surfaces 6,8 which are ultimately to carry the magnetic recording medium. The polishing process removes the outer glass surface because it is that surface which tends to have defects such as microcracks present therein. The amount of material which is removed during the polishing step depends on the initial degree of surface damage and also on the initial thickness of the glass disc 2. A typical thickness of the outer glass surface which is removed on polishing is between 10 and 50 um. The polishing step also smooths out the surfaces 6,8 of the glass disc 2. Typically, the polished surfaces have a surface roughness average of 0.5 to 1 nm, more particularly from 0.5 to 0.8 nm.

The average surface roughness parameter can be determined from measurement of the surface of the glass, for example, by means of an optical or stylus profilometer such as that made by Wyko Inc. of Arizona, U.S.A. and sold under model No. TOPO-3D or the Talystep profilometer made and sold by Rank Taylor Hobson of Leicester, England. Such profilometers can measure the profile of the surface of the substrate, the surface of which is composed of a series of peaks and valleys. The surface finish can be defined by a "mean line" which is a line which bisects the peak/valley profile such that over any given cross sectional length the area of the peaks above that line is equal to the area of the valleys below that line, with both areas being a minimum. The surface roughness average (which has also been referred to in the art as the arithmetic average or the center line average), is the arithmetic average of the distance of the roughness profile from the mean line over a given assessment length of the mean line or for a given number of assessment points along the mean line. The roughness average is statistically a stable parameter and is good for representing the roughness of random-type surfaces. The roughness average is also easy to implement into known profilometer instrumentation.

The polished glass is then cleaned by washing with an aqueous detergent and deionised water and then the glass disc 2 is dried in air or nitrogen gas.

Preferably, the glass disc is chemically strengthened. It is preferred that the chemical strengthening operation, which is well known per se to the man skilled in the art, is carried out at this stage, i.e. before printing and etching of the disc. However, the chemical strengthening operation could alternatively be carried out after the printing and etching steps. The glass disc is cleaned after the chemical strengthening step in the same manner described above in which the glass disc is cleaned after the polishing step.

Figure 2:
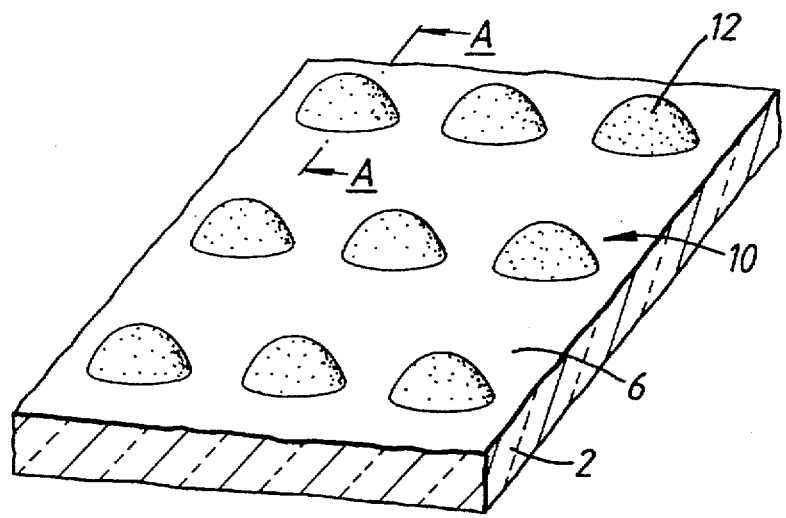
FIG. 2 is a schematic perspective view of the surface of the glass substrate of FIG. 1 which has been printed with an ink dot pattern in accordance with an embodiment of the present invention.
Figure 3:
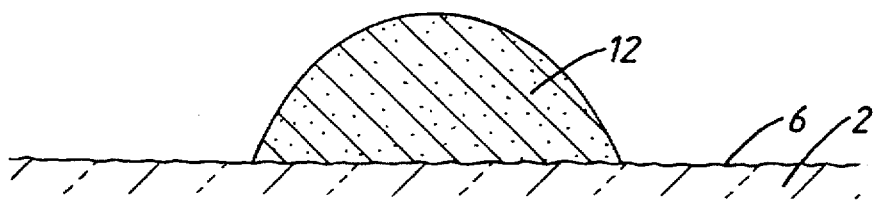
FIG. 3 is an enlarged cross-section on line A—A through an ink dot and the substrate shown in FIG. 2.

Referring to FIG. 2, the cleaned glass disc 2 is then printed in a manner described hereinbelow with a pattern 10 of ink onto each glass surface 6,8 (simultaneously or successively) of the disc 2. In this specification the term "printing" is intended to refer to a printing process in which ink is printed onto the glass surface; the printing process may be a gravure printing process, for example an offset gravure process such as pad printing; a lithographic printing process such as offset lithography, or a letter press printing process. The term "printing" does not encompass photo-lithographic techniques. In the illustrated embodiment, the pattern 10 is composed of ink dots 12. In FIG. 2, as in FIGS. 3 to 7, the vertical extent of the printed dots 12, and the resultant surface of the glass disc 2, are greatly exaggerated with respect of the horizontal extent (typically by a factor of 100 to 1000 to 1) for the sake of clarity of illustration. However, the pattern 10 may alternatively be composed of lines or other shapes, provided that after etching the desired surface roughening of the glass disc 2 is obtained. As will be seen with reference to FIG. 2, in the preferred embodiments the ink dot pattern 10 is printed in a regular array which may either be an orthogonal array, which is preferably a square array, or a non-orthogonal array, which may be a triangular array. Alternatively, the array may be circular with the dots being formed either in concentric circles or in radial lines. A triangular array can provide a high density array of ink dots. In plan view the dots may be circular, elliptical, rectangular with rounded corners or any other shape. Preferably, the dots are approximately circular in plan. Preferably, the pitch between adjacent ink dots ranges from 5 to 100 microns, with a typical value being from 15 to 30 microns. The pitch between the adjacent ink dots 12 is the distance between the centres of the adjacent dots 12. When the ink dots 12 are approximately circular in plan, depending on the limits of the printing process which is employed to print the dots 12, they preferably have a base diameter up to 60 um with a typical diameter being from 5 to 15 um. It is believed that the diameter of the ink dots 12 may be reduced, with careful control of the printing processes, down to about 2 um. The thickness of the ink dots 12 in the vertical direction is not particularly critical. The thickness is controlled so that the ink dot is of sufficient thickness so as to act as a mask during a subsequent etching process which is described hereinafter. Typically, the ink dots 12 are around a few microns thick, for example up to about 10 microns thick, more preferably from 2.5 to 10 microns thick.

The printing ink which is employed is of a type which is suitable for application to glass. The printing ink should be resistant to the selected etchant in the etching step but be cleanly removable from the glass surface subsequent to the etching step. The ink is preferably particulate-free but the ink may incorporate non-particulate colouring agents. However, the ink may for some applications contain a fine particulate pigment. The ink possesses a surface tension which enables extremely fine dots 12 to be printed on the surface of the glass substrate. Preferably the ink is a resinous ink. A suitable particulate-free ink is a resinous non-hardened ink of a group of inks sold by AM Ramp & Co. GmbH of Eppstein, Germany under the designation RUCO 10-KK, a particular ink being RUCO 10-KK-3976 NT. Another suitable resinous ink is sold in commerce by Marabu Werke GmbH & Co. of Tamm, Germany under the trade name MARABU GL. However other similar resinous inks may be employed. Such a resinous ink may be removed from the glass surface after the etching step by a solvent. Suitable solvents are butanone (ethyl methyl ketone), N-methyl-2-pyrrolidone, cyclohexanone, acetone, methanol/methylene chloride, or 1,1,2 trichloroethylene.

An example of another ink which can be employed in accordance with the present invention is an alkali removable acid etch resist ink which is manufacturered by Sericol Group Limited of London UK and is sold under the trade name PC966. That ink is sold commercially as a high definition screen ink for use in the production of printed circuit boards. The ink is generally used in combination with a thixotropic reducer for maintaining detailed printing.

If desired, the adhesion of the ink onto the glass can be controlled by the incorporation into the ink, or prior treatment of the glass, with a silane compound. This improves the adhesion between the ink and the glass.

Alternatively, the ink may be bonded effectively to the glass by including a hardener in the ink mix. Certain inks are known in the art as being suitable for bonding to glass. Such inks are two-part inks, one part of the ink being the non-hardened resinous ink and the other part being the hardener. In the case of RUCO 10-KK ink identified above, the hardener 37172 (also sold by AM Ramp & Co. GmbH) is preferred, preferably in an amount about 20% by weight of the ink. In certain applications, the degree of bonding between the glass and the ink can be too strong and so a smaller amount or even no hardener is added to the ink. Alternatively, a single component ink may be employed. If the bonding is not strong enough then baking or curing of the ink, for example by heating using a fan oven, microwave oven or any other means of treating the samples with electromagnetic radiation suitable for the curing/baking of printing inks, may improve the bonding. For example, overnight drying in a heated oven may be employed if heating temperatures are as low as 65° C. are used, although raising the temperature significantly reduces the time needed. For example, at 80° C. a typical heating period is around 1 hour.

Figure 4A:
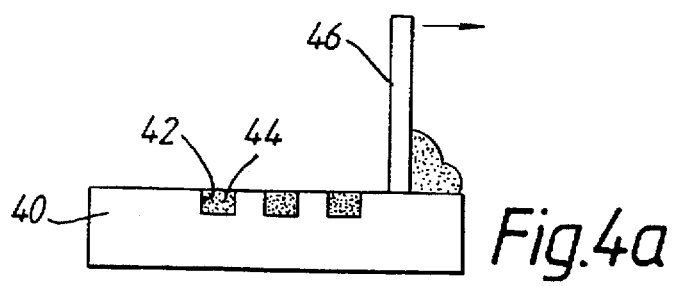
FIG. 4a to 4e illustrate schematically a sequence of steps in a pad printing process for printing the ink dot pattern of FIGS. 2 and 3.
Figure 4B:
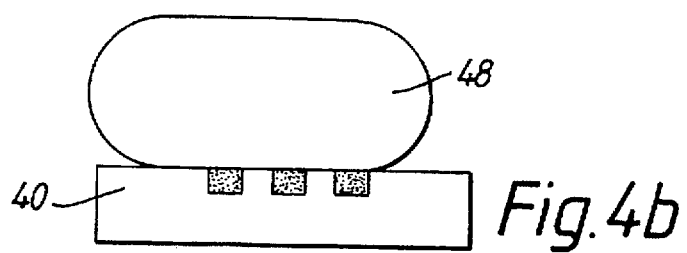
Figure 4C:
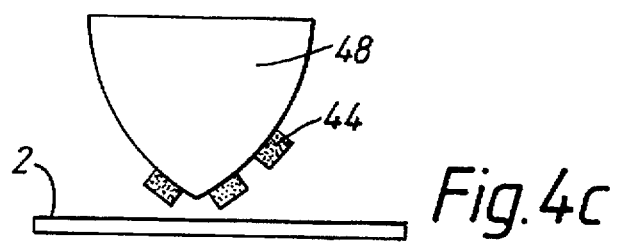
Figure 4D:
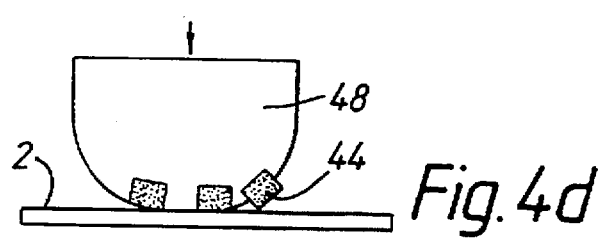
Figure 4E:
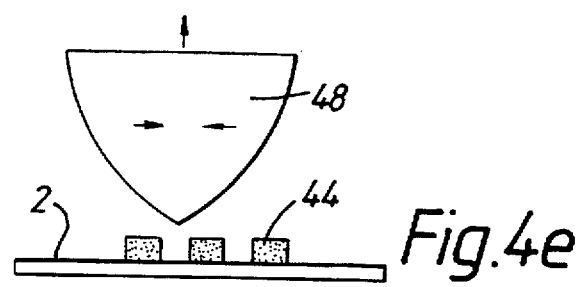

A variety of printing processes may be employed, such as offset gravure, letterpress or lithography. However, a preferred method of printing the matrix of ink dots 12 onto the glass substrate 2 uses an offset gravure method of printing known in the art as "pad" printing. This is broadly described as follows. As shown in FIG. 4a, the process uses a printing plate 40 which has etched into the surface thereof an array of pits 42 which matches the pattern which is required to be printed. The pits 42 are filled with ink 44 using, for example, a doctor blade 46, so as to form an ink dot pattern corresponding to the array of etched pits 42. Then the ink dots 44 are allowed to dry by a controlled amount so as to render the ink tacky. As shown in FIG. 4b, a pad 48 is pressed against the pattern of ink dots 44 on the printing plate 40. The ink dots 44 adhere preferentially to the pad 48 so that, when the pad 48 is removed from the plate 40, the ink dots 44 remain adhered to the pad 48 and are removed from the plate 40. As is shown in FIGS. 4c and 4d, the pad 48 is then pushed down onto the substrate 2 and the ink dots 44 are transferred onto the substrate 2. The pad 48 is then removed, depositing dots 44 in the desired array on the substrate 2.

More particularly, the printing plate 40 is preferably formed as follows. A "screen" is formed which can be either an acetate sheet with the images of the dots burned on it using a laser or a glass photomask (such as those available in commerce from the company Compugraphics of Glen Rothes, Scotland) which is formed with the desired pattern upon it. The screen is placed in contact with a photoresist layer coated on a metal plate, which may be of the type sold under the trade name "Nyloplate" sold by the firm Teca-Print UK of Sheffield, England. The photoresist is then exposed to a source of ultraviolet radiation. When large dot sizes are required, an acetate screen and a multipoint UV source are preferably used and when smaller dot sizes are required, the dots are preferably formed using a glass photomask and a single point TV source, which can produce better defined dots.

The photoresist layer is then developed by a known process so as to leave an array of pits in the resist layer. The photoresist layer can constitute the upper surface of printing plate 40 shown in FIG. 4a, or alternatively, the pits 42 can be etched completely through into the metal plate carrying the photoresist layer. In this embodiment, the photoresist layer is removed completely after etching of the pits 42 into the metal layer. This leaves a much more durable printing plate.

The printing plate 40 is then mounted on a pad printing machine, which is known in the art, and is flooded with ink thereby filling the array of pits 42. The excess ink is then scraped off automatically, back into a reservoir, by the doctor blade 46.

The ink viscosity tends to vary with local operating additions and is adjusted as necessary by dilution with an appropriate amount of a suitable thinner such as the thinner sold by AM Ramp & Co. GmbH under the trade name Ruco 100 VR 1271. Typically, the viscosity of the ink may vary from 0.5 to 8 seconds as measured using a Teca-Print viscospatula.

The pad 48 comprises a specially shaped silicone rubber pad, such as that available in commerce from Teca-Print UK mentioned above or the company F. Schmid of Cormoret, Switzerland. The pad has the property of being relatively deformable and so is able to contact all the ink dots 44 in the holes of the printing plate 40. In the printing machine, such as that available in commerce from Teca-Print UK referred to hereinabove, the pad 48 is carefully brought into contact with the array of ink dots 44. The printing machine is adjusted so as to apply the pad over the required surface of the printing plate and at the right pressure enabling it to pick up the whole array of ink dots. The pad 48 is then brought by the machine into contact with the glass disc substrate and the dots are deposited onto the glass disc substrate in the defined array.

The present inventors have found that the pad printing process illustrated in FIGS. 4a to 4e does not always put sufficiently circular dots of ink down onto the glass substrate. For example, the dots of ink may have an eliptical or otherwise non-circular configuration. The present inventors have found that more circular dot shapes can be obtained if the printing ink contains only fine particulate material or more preferably no particulate material. The present inventors have further found that after the printing step, if the temperature of the printed ink dots is raised above 80° C., more particularly during the drying stage after the printing step, then the ink dots become more rounded. It is believed that during the heating step, the ink becomes sufficiently fluid so that the surface tension forces are strong enough to cause the ink dot to consolidate and become significantly more circular in plan. This rounding effect has been seen using the ink Ruco 10 KK-3976 referred to above. This ink contains no particulate pigment and is used without a hardener. It is believed that without a pigment, it is possible for the ink to become more mobile at a higher temperature and consequently readily spherodises so as to become rounder on heating.

The rounding of the printing dots provides a technical advantage in the final printed glass substrate. This is because when the dots are more circular in plan in the printed structure then the dots will etch to give a more uniform series of textured peaks in the glass substrate. This can significantly assist in the consistency of the flying characteristics of the magnetic disc head.

Following the printing operation, the glass substrate 2 is then subjected to an etching process in which the surface regions of the glass substrate 2 which are not directly covered by the masking array 10 of printed ink dots 12 are etched to a controlled depth in order to roughen or texture the surface of the glass substrate 2 to the desired roughness without substantially changing the overall flatness of the disc. The etching is carried out either by chemical etching, for example by the use of wet chemical etching, typically by using aqueous solutions of hydrogen fluoride, ammonium bifluoride or fluorosilicic acid, each optionally with an addition of sulphuric acid; or by reactive ion plasma etching. The etching step may utilise agitation of the liquid etchant, for example, by ultrasonic vibration, in order to accelerate the etching of the glass.

Figure 5:
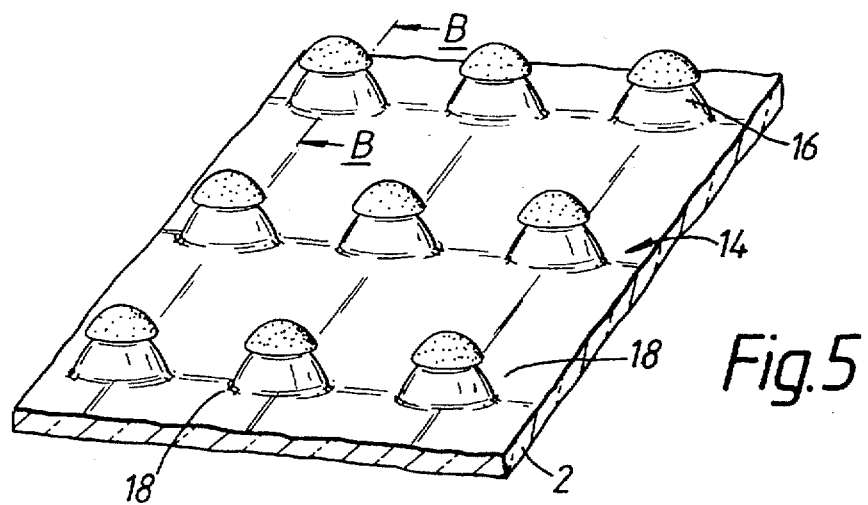
FIG. 5 is a schematic perspective view of the glass substrate of FIGS. 2 and 3 after an etching step in accordance with the embodiment of the present invention.
Figure 6:
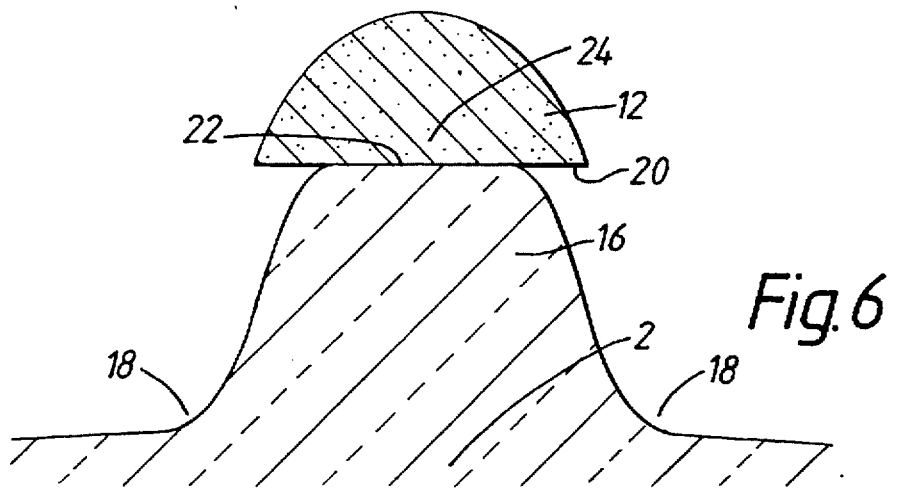
FIG. 6 is an enlarged cross-section on line B—B through an ink dot and the underlying glass surface of the etched substrate shown in FIG. 5.

FIGS. 5 and 6 show the glass substrate 2 after the etching step.

Referring to FIGS. 5 and 6, in the illustrated embodiment, the unmasked surface of the glass substrate 2 has been etched by an aqueous solution of hydrogen fluoride. Typically, the concentration of the hydrogen fluoride solution is from 0.01 to 0.5 wt %. The etch depth can be controlled depending on the selected etch temperature, etch time and etchant concentration but it has been found that if the hydrogen fluoride solution is too concentrated then the etch process can be difficult to control. Generally, the concentration of the etchant, the etch temperature, the etch time and the etch rate are controlled so as to be readily compatible with a production environment. It will be noted from FIGS. 5 and 6 that the unmasked surface of the glass substrate 2 is etched to provide an array 14 of glass peaks 16 on the glass surface, the distribution of the array 14 corresponding to that of the original printed ink dots 12. The peaks 16 are separated by flat bottom valleys 18. The etch process is calibrated by performing a series of prior etch calibration tests so that for any set of process conditions a known etch period can produce the desired degree of etching of the glass surface. At the end of the prior-calibrated etch period the etching process is stopped by removal of the substrate from the etchant solution and washing with water (possibly after immersion in dilute sodium carbonate solution). The etch process is controlled so as to provide in the resultant substrate average peak heights of from 0.5 to 40 nm. The range of peak heights of the etched surface is typically around +/−20% of the average peak height. As with the array 10 of printed ink dots 12, the glass peaks 16 are typically around 5 to 30 microns in base diameter and have a repeat pitch which is typically from 10 to 100 microns, more preferably from 20 to 60 microns. The surface roughness of the etched glass substrate 2 can be measured using the optical profilometer referred to hereinabove.

We have found that by using the masked etching process, particularly by using liquid chemical etchants, the etching of the glass substrate 2 occurs underneath the peripheral edge 20 of the ink dots 12 leading to a detachment of the peripheral edge 20 of the ink dot 12 from the etched glass substrate 2. This is shown in FIG. 6. It is believed that this phenomenon occurs because detachment of the ink dot 12 proceeds at a faster rate in a horizontal direction than the rate at which the glass is etched. Thus, in the final etched microstructure, the ink dots 12 tend partly to be adhered to the glass substrate 2 by their central portion 24. This provides the advantage that the glass peaks 16 on the glass substrate surface are relatively narrow and thus have a good profile for avoiding the stiction phenomenon referred to hereinabove. The smooth physical dimensions of the peaks 16 on the glass substrate 2 give good mechanical strength to the glass substrate 2 by means of a simple masking and etching technique. The simple masking and etching technique can provide a regular array of very fine surface peaks which can provide the desired roughening or texturing required to enable a thin film magnetic data storage disc to be employed without encountering undue stiction problems.

When the etching step employs a liquid etchant, solvents may be present in the liquid etchant which tend to reduce the adhesion of the ink dot to the glass substrate around the periphery of the ink dot leading to enhanced lateral etching of the glass substrate around the periphery of the portion of the glass substrate masked by the ink dot. This leads to control of the texturing of the surface by rounding of the upper surface of the peak produced in the etched microstructure. A suitable solvent for use in the etchant solution is N-Methyl-2 Pyrrolidone (NMP). NMP may be used in the etchant solution at a concentration of up to about 10% by volume. The solvent also reduced the variation in the etched peak heights. The solvent may alternatively be butanone (Ethyl Methyl Ketone).

Figure 7:
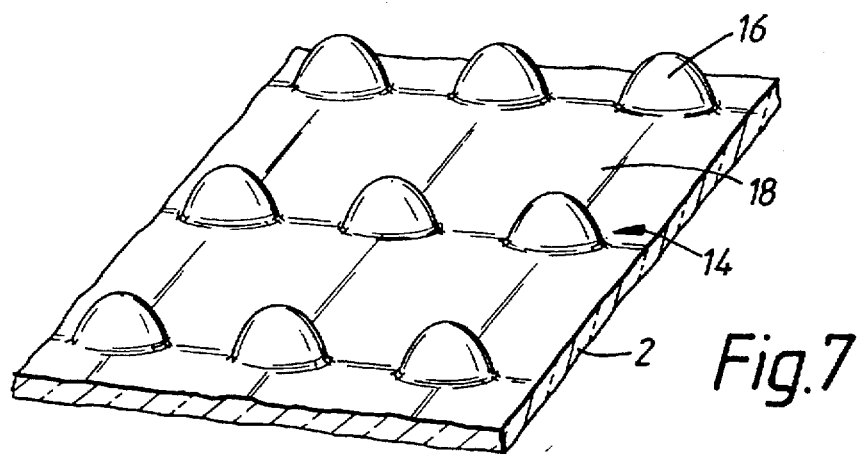
FIG. 7 is a schematic perspective view of the glass substrate shown in FIGS. 5 and 6 after removal of the printed ink dot pattern.

After the etching step, the ink dot 10 array is removed with a solvent in the case of resinous inks or with an alkaline detergent in the case of acid etch resistant inks. The disc is rinsed with deionised water and then dried and the resultant glass substrate surface is illustrated in FIG. 7.

Although an acceptable texture can be obtained by the use of the etching step as a final texturing step of the glass substrate, it is, in accordance with the present invention, possible additionally to incorporate a further post etch treatment of the glass surface so as further to modify the texture of the surface. For example, the etched surface may be treated by very light polishing or by other forms of additional whole surface etching, which may be either wet etching or dry etching. This further processing step may be employed either to roughen the surface or further to smooth the peaks of the texture, depending on the requirements of the particular product which is being manufactured. Thus the man skilled in the art will appreciate that the present invention provides a comprehensive scheme for manufacturing a glass disc substrate for a magnetic disc with the desired texture.

As referred to hereinabove, in accordance with the present invention the glass disc substrate may be chemically strengthened. The chemical strengthening step may be carried out either before or after the texturing process of the present invention. Thus when the chemical strengthening step is carried out before the texturing process, the ultimate glass substrate is still chemically strengthened because the texturing step has not removed all of the chemically strengthened surface of the glass. Alternatively, the chemical strengthening step can be carried out after the texturing step so as to leave at least sufficient residual texture in the surface of the glass substrate.

Samples of glass substrates made in accordance with the invention were tested to assess their ability to overcome the stiction phenomenon referred to hereinabove. In order to be suitable for use in a thin film magnetic data storage disc drive, the glass substrate of the magnetic disc must have surface features which exhibit good mechanical durability as well as having a suitable textured surface to reduce the friction between the recording head and the conformally coated substrate. Glass substrates made in accordance with the invention were coated, in the conventional manner i.e. by sputtering, with magnetic recording medium and then the magnetic recording medium was overcoated with a protective coating in the conventional manner. It is also conventional to coat the surface of the resultant thin film magnetic data storage disc with an appropriate lubricant in order to reduce the friction between the magnetic disc and the magnetic head.

The present invention is further illustrated with reference to the following non-limiting examples.

EXAMPLE 1

Magnetic discs manufactured in this way by employing substrates made in accordance with the present invention were subjected to an IDEMA (International Disc Equipment and Materials Association) standard CSS tests to assess the friction co-efficient Vd representing the stiction between the magnetic disc and the head. The head was of the thin film transverse type. The CSS test was carried out on a single disc which was rotated at 3,600 rpm. Each magnetic disc had an outer diameter of 65 mm and the internal diameter of the centre hole was 20 mm. The glass thickness of each disc was 0.635 mm (0.025 inch). Each glass substrate was formed using a regular rectangular array of printed ink dots prior to the etching process. After etching, the average peak height was approximately 10 nm (i.e. about 100 Angstroms) and the average peak pitch was around 65 um. The results of the tests are shown in Table 1.

TABLE 1

| Number of CSS Cycles | Disc 1 Friction Coefficient Vd | | | Disc 2 Friction Coefficient Vd | | |
|---|---|---|---|---|---|---|
| | Side 1 | Side 2 | Average | Side 1 | Side 2 | Average |
| 200 | 0.45 | 0.45 | 0.45 | 0.56 | 0.36 | 0.46 |
| 2000 | 0.57 | | 0.57 | 0.65 | | 0.65 |
| 4000 | 0.58 | | 0.58 | 0.64 | | 0.64 |
| 6000 | 0.58 | | 0.58 | 0.65 | | 0.65 |
| 8000 | 0.60 | | 0.60 | 0.65 | | 0.65 |
| 10000 | 0.61 | | 0.61 | 0.66 | | 0.66 |
| 12000 | 0.62 | | 0.62 | 0.68 | | 0.68 |
| 14000 | 0.62 | | 0.62 | 0.68 | | 0.68 |
| 16000 | 0.61 | | 0.61 | 0.66 | | 0.66 |

In the single disc CSS test, the results of which are shown in Table 1, a disc was subjected to a number of start/stop cycles as shown in the column entitled "surface cycle". The disc was then stopped and on starting the disc the mean value of the static friction coefficient Vd between the recording head and the disc was measured at a starting speed of 1 rpm. Table 1 shows the results of the test on both sides of the tested disc.

Typically, it is desired that the friction coefficient is in the range up to about 1.0, although the Vd value can be altered depending on the type and amount of lubricant which is applied to the surface of the disc. It will be noted that the Vd value increases slightly with increasing number of test cycles. This indicates that the static friction increases with increased usage of the disc due to surface damage. The measured values of Vd are preferably less than about 0.4. A typical target for the value of Vd for optimal operation is around 0.3 and it is believed that in the embodiment illustrated in Table 1 if further tests were carried out employing different lubricants or optimising the amount of lubricant, then the values of Vd would be decreased to this desired value. The friction coefficient Vd is dependent on the combination of both the surface texture of the disc and the lubricant which is employed.

Discs made in accordance with the present invention were also subjected to "glide" testing. The glide test studies the behaviour of the disc under steady running conditions with the head flying above the disc surface. There is no need for lubrication of the disc surface since the head is not intended to contact the surface as in the CSS test described above. A good disc will just run in the glide test with "no" flaws. If the head intermitently hits the disc surface or debris on the disc surface, then the disc would have problems in operating in use. If such problems are serious then the head will "crash". In the glide test, the disc is set to rotate and the head is positioned over the disc surface at a suitable height which is determined in relation to the speed of the disc and the head characteristics. A typical height is from 50 to 100 nm (from $2 \times 10^{-6}$ or $4 \times 10^{-6}$ inches). The disc system is allowed to run and is monitored for the head hitting the surface of the disc or debris on the surface of the disc. With good discs there should be little or no contact with the substrate. It has been found that with the textured discs manufactured in accordance with the present invention, the head can fly at a typical height of around 100 nm (4 microinches) above the disc without encountering any problems.

EXAMPLES 2 to 25

These Examples, which are shown in Table 2, illustrate the use of different printing methods; the use of different pad materials in offset gravure pad printing; the use of different inks; different dot spacing; different dot base diameters; and different drying and curing regimes. Examples 2 to 5 illustrate the use, respectively, of offset gravure pad printing, letterpress printing, offset lithography and gravure printing techniques to print the ink dots on the glass substrates. In addition to the printing technique, Table 2 shows the pad material and the ink employed in the printing method, if appropriate; whether or not there was pigment in the ink; the drying temperature, drying time and drying method, if employed; the dot spacing and the print dot base diameter; and also the percentage of dots present after the printing process (i.e the printing efficiency of the printing process).

Examples 6 to 8 illustrate the use of different offset gravure pad materials in the pad printing process, the pad material being indicated by the relevant trade name in the Table. Examples 9 to 11 illustrate the use of different inks. The designation (r) or (b) in the ink type means red or black respectively. Examples 12 to 16 illustrate the use of different dot spacings using the offset pad printing process and Examples 17 to 19 illustrate variations in the dot base diameter using different pads and processes. Examples 20 to 25 illustrate different drying and curing regimes, being either in air, an oven or a microwave oven.

EXAMPLES 26 to 30

Examples 26 to 30 illustrate the different etched conditions and regimes employed to produce textured glass substrates having the specified peak height, peak height standard deviation and peak radius in the textured surface. The results are indicated in Table 3.

EXAMPLES 31 to 48

Examples 31 to 48 illustrate the use of different printing methods and also illustrate the different etched conditions and regimes employed to produce textured glass substrates having the specified peak height, peak height standard deviation and peak radius in the textured surface. Tables 4 and 5 indicates the composition of the etchant, the type and quantity, if appropriate, of a solvent, the etch time and the etch temperature and whether or not there was any agitation of the etch bath. The Tables also indicate the peak height, the peak height standard deviation and the peak radius. Examples 31 to 34 illustrate the use of different etch mixtures and concentrations. Examples 35 to 42 illustrate the use of different etch times. Examples 43 to 45 illustrate the use of different etch temperatures and Examples 46 to 48 illustrate different height ranges.

EXAMPLES 49 to 51

As shown in Table 6, Example 49 utilizes a polishing treatment after etching and Examples 50 and 51 employ butanone or methanol as a solvent to remove the ink after the etching treatment.

EXAMPLES 52 to 57

These Examples illustrate, with reference to Table 7, the results of CSS static friction test and CSS dynamic friction tests of magnetic media-coated glass substrates fabricated in accordance with the present invention. Table 7 indicates the printing method and the etchant regime and whether or not any cleaning or other post etch treatment was effected. It will be seen that in accordance with the present invention, low values of Vd can be achieved. In particular, it will be noted in accordance with the present invention the friction coefficient can be around 0.3.

EXAMPLE 58

Example 58 shows with reference to Table 8 the use of a hardener in an ink. The hardener was the hardener sold by Ruco under designation 37172 specified above and was present at 20% by weight in the ink composition.

EXAMPLES 59 to 70

These Examples, which are illustrated in Tables 9 and 10, illustrate the use of N-Methyl-2-Pyrrolidone in the etchant. Table 10 shows the etchant conditions on a glass substrate carrying ink dots which have been printed using the conditions illustrated in Table 9. There was no agitation of the etchant. It will be seen from a comparison of Examples 59 to 62 that an increase in the pointed nature of the peaks in the glass surface results with increasing etch times.

EXAMPLES 71 to 73

These Examples illustrated the use of chemical strengthening and its effect on the texture. A glass substrate was printed and etched in accordance with the conditions indicated in Table 11. Table 12 shows the results of chemical strengthening prior to texturing on the resultant microstructure. The P-V value is the maximum peak to the minimum valley height of the texture. The SD value is the standard deviation of the variation of P-V and is a measure of how consistent the P-V value is. Table 13 shows the texture on a glass substrate which has not been chemically strengthened but has been treated to the same printing and etching conditions. Table 14 shows the texture measurements when chemical strengthening has been carried out after the texturing process. It will be seen from a comparison of Tables 14 and 13 that the SD values are significantly less that the P-V values which show that the peak to valley height is surviving with little change as a result of the chemical strengthening step.

In accordance with the present invention, either the whole area of the substrate or only selected portions of the area may be textured as aforesaid. Alternatively, the whole disc may be textured but with different areas textured in different ways. Thus the invention may employ limited area texturing for the manufacture of substrates suitable for so-called "contact recording" thin film magnetic data storage discs having a superfine polished surface over the majority of the disc surface. For the manufacture of such discs, the present invention can be employed to texture an annulus, typically 8 mm wide, surrounding the centre hole of the disc. Such textured annulus, in the resultant data storage disc, can be employed as a "parking zone" for the read/write head.

The parking or landing zone can be made by the printing and etching process, with or without masking of the data storage area of the disc, by a gradation in the dot size (diameter) from the outer rim of the annulus to a constant dot diameter towards the centre hole of the disc. This technique provides a gentle ramp to a constant height plateau up which the read/write head can "fly", "land" and "park". The smallest dots of ink can give lower peak heights. The dots may be in rectangular arrays, triangular arrays, concentric ring arrays or continuous concentric rings. The surface roughening of the textured surface thus can be varied to define a plurality of functional zones of the substrate, the zones including a landing zone and a read/write zone, each zone having the desired surface roughening, with optionally there being a graded ramp of roughening between adjacent zones.

In accordance with the invention, experiments have been carried out using simple landing zones, by using a disc surface which is untextured apart from a band which acts as a "parking" zone. Such landing zone textures were uniform in height and ranged from 16 to 32 nm. The landing zones were tested by rotating the discs and permitting a head to fly above the rotating surface at a typical flying height of around 100 nm (4 microinches). The results of the test showed that the head could fly across the boundary between the landing zone and the remainder of the disc without "crashing" i.e. contacting the disc surface and causing damage thereto.

Another form of landing zone known as a "down" zone may be produced which is an annular textured area where the peaks of the texture are on the same level as the other areas over which the head flies. These other areas may be adjacent and may be either polished or have a significantly shallower texture than the original "down" zone. This substrate can be produced by protecting all over the adjacent areas with a complete covering mask of, for example, printing ink and then printing the texture pattern on to the "down" zone area. During etching, the texture develops only where the glass is exposed. Subsequent cleaning produces a "down" zone as required with adjacent flat polished areas. This arrangement allows the magnetic head to move laterally across the the disc whilst encountering significantly less upset to its flying characteristics than with the previously described landing zone.

In order to produce a two texture substrate, first the whole disc may be covered with the shallow texture by printing overall with the required array and performing a shallow texturing etch. The ink is then cleaned off. Next, the area required to have the shallow texture on the final disc is completely covered with ink to protect the textured surface during subsequent processing. Then the "down" zone is reprinted with the ink dot array required for that area and etched with the stronger conditions necessary to produce the higher texture of the "down" zone. This superimposes the deeper texture of the "down" zone on the shallower texture already present, which is etched out. Alternatively, each area can be protected whilst the other area is printed and etched to be textured to the required degree.

The present invention has enabled the production of a glass substrate for a thin film magnetic data storage disc which results in the magnetic disc having the required low friction coefficient to enable it to pass the known CSS tests for thin film magnetic data storage discs. The process of the invention, employing an etching and masking technique, is very simple but nevertheless gives good stiction performance coupled with the provision of good mechanical strength to the glass substrate which improves the lifetime of the magnetic disc. The good profile of the glass substrate results from the formation of a narrow peak profile. The etching process also removes surface edge defects which could potentially lead to mechanical failure of the glass substrate, for example by the propagation of microcracks. The peak pitch and height can be controlled relatively easily using the masking and etching process, which employs simple and relatively inexpensive printing technology. The printing technique has the advantage of providing good repeatability of surface texturing both from one disc to another and between different areas of any given disc.

TABLE 2

|  | Example | | | | | | | |
|---|---|---|---|---|---|---|---|---|
|  | 2 | 3 | 4 | 5 | 6 | 7 | 8 | 9 |
| PRINTING METHOD | Offset Gravure | Letter Press | Offset Litho. | Gravure | Offset Gravure | Offset Gravure | Offset Gravure | Offset Gravure |
| Pad material | Teca pink 26 | NA | NA |  | Teca pink 26 | Teca green 597 | Schmid white 267 | Schmid white |
| Ink | Ruco 10kk(r) | Ink (black) | NA | 10KK(b) | Ruco 10kk(r) | Ruco 10kk(b) | Ruco 10kk(r) | Marabu GL(b) |
| Pigment in the Ink | no | Yes | NA | Yes | no | Yes | No | Yes |
| Drying temperature Deg C. | 80 | 66 | NA |  | 80 | 60 | 66 | 66 |
| Drying time (hours) | 1 | 26 | NA |  | 1 | 16 | 26 | 48 |
| Drying method | Oven | oven | NA |  | Oven | oven | Oven | oven |
| Dot spacing um | 45 | 20 | 65 | 30 | 45 | 65 | 20 | 20 |
| Dot base diameter um | 13 | 10 | 30 | 15 | 13 | 20 | 7 | 11 |
| % of dots present | 98 | — |  |  | 98 | 97 | 97 | 95 |

|  | Example | | | | | | | |
|---|---|---|---|---|---|---|---|---|
|  | 10 | 11 | 12 | 13 | 14 | 15 | 16 | 17 |
| PRINTING METHOD | Offset Gravure | Offset Gravure | Offset Gravure | Offset Gravure | Offset Gravure | Offset Gravure | Offset Gravure | Offset Gravure |
| Pad material | Teca green 597 | Teca pink 26 | Teca green 597 | schmid white 267 | Teca green 597 | Teca Pink 26 | Teca pink 26 | schmid white 267 |
| Ink | Ruco 10KK(b) | Ruco 10kk(r) | Ruco 10KK(b) | 10kk(r) | Ruco 10kk(b) | Ruco 10kk(r) | Ruco 10kk(r) | Ruco 10kk(r) |
| Pigment in the Ink | Yes | no | none | No | Yes | none | no | No |
| Drying temperature Deg C. | 60 | 80 | 60 | 66 | 60 | 23 | 80 | 66 |
| Drying time (hours) | 16 | 1 | 16 | 26 | 16 | 16 | 1 | 26 |
| Drying method | oven | Oven | Oven | Oven | oven | air | Oven | Oven |
| Dot spacing um | 65 | 45 | 30 | 20 | 65 | 30 | 45 | 20 |
| Dot base diameter um | 20 | 13 | 12 | 7 | 20 | 12 | 13 | 7 |
| % of dots present | 97 | 98 | 95 | 97 | 97 | 98 | 98 | 97 |

|  | Example | | | | | | | |
|---|---|---|---|---|---|---|---|---|
|  | 18 | 19 | 20 | 21 | 22 | 23 | 24 | 25 |
| PRINTING METHOD | Offset Gravure | Offset Gravure | Offset Gravure | Offset Gravure | Offset Gravure | Offset Gravure | Offset Gravure | Offset Gravure |
| Pad material | Teca green 597 | Teca pink 26 | Teca pink 26 | Teca green 26 | Schmid white | Teca green 26 | Teca pink 26 | Teca pink 26 |
| Ink | Ruco 10kk(b) | Ruco 10kk(r) | Ruco 10kk(r) | Ruco 10KK(b) | MARABU GL(b) | Ruco 10KK(b) | Ruco 10kk(r) | Ruco 10kk(r) |
| Pigment in the Ink | Yes | none | none | Yes | Yes | Yes | none | no |
| Drying temperature Deg C. | 60 | 23 | 23 | 40 | 66 | 80 |  | 80 |
| Drying time (hours) | 16 | 16 | 16 | 0.5 | 48 | 0.5 | 0.07 | 1 |
| Drying method | oven | air | air | oven | oven | oven | microwave | Oven (melted ink) |
| Dot spacing um | 65 | 30 | 30 | 65 | 20 | 65 | 30 | 45 |
| Dot base diameter um | 20 | 12 | 12 | 40 | 11 | 40 | 15 | 13 |
| % of dots present | 97 | 98 | 98 | 100 | 95 | 100 | 97 | 98 |

TABLE 3

|  | Example | | | | |
|---|---|---|---|---|---|
| ETCH | 26 | 27 | 28 | 29 | 30 |
| Mixture composition HF % | 0.1 | 0.05 | 1 | 0.05 | 0.01 |
| H2SO4 % | 0 | 0 | 1 | 0.05 | 0.01 |
| NH4F.HF % |  |  |  |  |  |
| Solvent |  |  |  |  |  |
| Solvent quantity % |  |  |  |  |  |
| Etch time min | 3.5 | 3.5 | 5 | 4 | 20 |
| Etch temperature deg C. | 21 | 25 | 25 | 25 | 80 |

TABLE 3-continued

|  | Example | | | | |
|---|---|---|---|---|---|
| ETCH | 26 | 27 | 28 | 29 | 30 |
| Agitation of etch bath. |  |  |  |  |  |
| Height of peak. (um) | 40 | 20 | 106 | 21.4 | 28 |
| Height S.D. (um) | 2 | 1.5 | 27 | 2 | 4.7 |
| Peak radius nm | 1 | 1 |  |  |  |

TABLE 4

Example

|  | 31 | 32 | 33 | 34 | 35 | 36 | 37 | 38 |
|---|---|---|---|---|---|---|---|---|
| PRINTING METHOD | Offset Gravure | | | | | | | |
| Pad material | Teca green 597 | Teca green 597 | teca green 597 | Teca green 597 | Teca green 597 | Teca green 597 | Teca green 597 | teca green 597 |
| Ink | Ruco 10kk(r) | Ruco 10kk(r) | Ruco 10kk(b) | Ruco 10kk | Ruco 10kk | Ruco 10kk | Ruco 10kk | Ruco 10kk |
| Pigment in the Ink | none | none | Yes | none | none | none | none | none |
| Drying temperature Deg C. | 70 | 70 | 60 | 68 | 70 | 70 | 70 | 70 |
| Drying time (hours) | 16 | 16 | 16 | 20 | 16 | 16 | 16 | 16 |
| Drying method | Oven | Oven | oven | | | | | |
| Dot spacing um | 30 | 30 | 65 | 30 | 30 | 30 | 30 | 30 |
| Dot base diameter um | 11 | 11 | 20 | 15 | 11 | 11 | 11 | 11 |
| % of dots present | 97 | 97 | 97 | 96 | 97 | 97 | 97 | 97 |
| ETCH | | | | | | | | |
| Mixture composition HF % | 0.03 | 0.02 | 0.05 | 0.05 | 0.05 | 0.05 | 0.05 | 0.05 |
| H2SO4 % | 0.03 | 0.02 | 0.05 | 0.05 | 0.05 | 0.05 | 0.05 | 0.05 |
| NH4F.HF % | | 0.008 | | | | | | |
| Solvent | | | Butanone | Butanone | Butanone | Butanone | Butanone | Butanone |
| Solvent quantity % | | | 7 | 3 | 7 | 7 | 7 | 7 |
| Etch time min | 20 | 3 | 5.5 | 5 | 4 | 5 | 6 | 8 |
| Etch temperature deg C. | 60 | 25 | 25.6 | 25 | 25 | 25 | 25 | 25 |
| Agitation of etch bath. | | | | | | | | |
| Height of peak. (um) | 70 | 19.7 | 18 | 34 | 13.6 | 13.7 | 14.1 | 12.2 |
| Height S.D. (um) | 12 | 0.7 | 2 | 5 | 0.6 | 1.2 | 1 | 1 |
| Peak radius mm | | | 2.5 | | | | | |

TABLE 5

| | Example | | | | | | | | | |
|---|---|---|---|---|---|---|---|---|---|---|
|  | 39 | 40 | 41 | 42 | 43 | 44 | 45 | 46 | 47 | 48 |
| PRINTING METHOD | Letter press | | | | Offset Gravure | | | | | Letter press |
| Pad material | NA | NA | NA | NA | teca green 597 | Teca green 26 | Teca green 59 | NA | Teca green 597 | NA NA |
| Ink | Ink(b) | Ink(b) | Ink(b) | Ink(b) | Ruco 10kk(b) | Ruco 10KK(b) | Ruco 10kk(r) | NA | Ruco 10kk(b) | Ink(b) |
| Pigment in the Ink | Yes | Yes | Yes | Yes | Yes | Yes | none | NA | Yes | Yes |
| Drying temperature Deg C. | 66 | 66 | 66 | 66 | 60 | 40 | 70 | NA | 60 | 66 |
| Drying time (hours) | 26 | 26 | 26 | 26 | 16 | 0.5 | 16 | NA | 6 | 28 |
| Drying method | oven | oven | oven | oven | oven | | | NA | oven | oven |
| Dot spacing um | 20 | 20 | 20 | 20 | 65 | 65 | 30 | 65 | 45 | 20 |
| Dot base diameter um | 10 | 10 | 10 | 10 | 20 | 30 | 11 | 30 | 20 | 10 |
| % of dots present | | | | | 97 | 98 | 97 | | 99 | |
| ETCH | | | | | | | | | | |
| Mixture composition HF % | 0.05 | 0.05 | 0.05 | 0.05 | 0.05 | 0.02 | 0.03 | 0.1 | 0.05 | 0.05 |
| H2SO4 % | 0.05 | 0.05 | 0.05 | 0.05 | 0.05 | 0.02 | 0.03 | 0 | 0 | 0.05 |
| NH4F.HF % | | 0.008 | | | | | | | | |
| Solvent | | | | | Butanone | | | | | |
| Solvent quantity % | | | | | 7 | | | | | |
| Etch time min | 3 | 4 | 5 | 8 | 5.5 | 20 | 20 | 3.5 | 3.5 | 3 |
| Etch temperature deg C. | 25 | 25 | 25 | 25 | 25.6 | 35 | 60 | 21 | 25.5 | 25 |
| Agitation of etch bath. | | | | | | | | | | |
| Height of peak. (um) | 7 | 10 | 13 | 7 | 18 | | 70.2 | 40 | 20 | 7 |
| Height S.D. (um) | 2 | | | | 2 | | 12 | 2 | 2 | 2 |
| Peak radius mm | 0.3 | | | | 2.5 | | 1 | | | 0.3 |

TABLE 6

| | Example | | |
|---|---|---|---|
|  | 49 | 50 | 51 |
| PRINTING METHOD | Offset Gravure | Offset Gravure | Offset Gravure |
| Pad material | Teca green 26 | Teca pink 26 | Teca green 597 |
| Ink | Ruco 10KK(b) | Ruco 10kk(r) | Ruco 10kk(b) |
| Pigment in the Ink | Yes | no | Yes |
| Drying temperature Deg C. | 65 | 80 | 60 |
| Drying time (hours) | 16 | 1 | 16 |
| Drying method | oven | Oven | oven |
| Dot spacing um | 65 | 45 | 65 |

TABLE 6-continued

| | Example | | |
|---|---|---|---|
|  | 49 | 50 | 51 |
| Dot base diameter um | 25 | 13 | 20 |
| % of dots present | | 98 | 97 |
| ETCH | | | |
| Mixture composition HF % | 0.05 | 0.05 | 0.05 |
| H2SO4 % | | 0.05 | 0.05 |
| NH4F.HF % | | | |
| Solvent | | | Butanone |

TABLE 6-continued

|  | Example | | |
|---|---|---|---|
|  | 49 | 50 | 51 |
| Solvent quantity % |  |  | 7 |
| Etch time min | 3.5 | 4 | 5.5 |
| Etch temperature deg C. | 25 | 25 | 25.6 |
| Agitation of etch bath. |  |  |  |
| Height of peak. (um) | 20 | 21.4 | 18 |
| Height S.D. (um) | 2 | 2 | 2 |
| Peak radius mm | >15 |  | 2.5 |
| CLEANING |  |  |  |
| Ink |  | butanone | Methanol |
| OTHER | Polish |  |  |

TABLE 7

|  | Example | | | | | |
|---|---|---|---|---|---|---|
|  | 52 | 53 | 54 | 55 | 56 | 57 |
| PRINTING METHOD | Offset Gravure | Offset Lithography | Offset Gravure | Offset Gravure | NA | NA |
| Pad material | Teca green 26 | NA | Teca green 597 | teca green 597 | NA | NA |
| Ink | Ruco 10KK(b) | NA | Ruco 10kk(b | Ruco 10kk(b) | Ruco 10kk(b) | Ruco 10kk(b) |
| Pigment in the Ink | Yes | NA | Yes | Yes | Yes | Yes |
| Drying temperature Deg C. | 65 | NA | 60 | 60 | 60 | 60 |
| Drying time (hours) | 16 | NA | 6 | 16 | 16 | 16 |
| Drying method | Oven | NA | oven | oven | oven | oven |
| Dot spacing um | 65 | 65 | 45 | 65 | 65 | 65 |
| Dot base diameter um | 25 | 30 | 20 | 20 | 15 | 25 |
| % of dots present |  |  | 99 | 97 | 96 | 99 |
| ETCH |  |  |  |  |  |  |
| Mixture composition HF % | 0.05 | NA | 0.05 | 0.05 | 0.05 | 0.05 |
| H2SO4 % |  |  | 0 | 0.05 |  | 0 |
| NH4F.HF % |  |  |  |  |  |  |
| Solvent |  |  |  | Butanone |  |  |
| Solvent quantity % |  |  |  | 7 |  |  |
| Etch time min | 3.5 |  | 3.5 | 5.5 | 4.5 | 3.5 |
| Etch temperature deg C. | 25 |  | 25.5 | 25.6 | 25 | 25 |
| Agitation of etch bath. |  |  |  |  |  |  |
| Height of peak. (um) | 20 | 15 | 20 | 18 | 20 | 20 |
| Height S.D. (um) | 2 | 2 | 2 | 2 |  | 1.5 |
| Peak radius mm | >15 | 12.5 |  | 2.5 | 0.3 | 1 |
| CLEANING |  |  |  |  |  |  |
| Ink |  |  |  | Methanol |  |  |
| OTHER | Polish |  |  |  |  |  |
| COATING | Media | Media | Media | Media | Media | Media |
| TEST |  |  |  |  |  |  |
| css static frict. |  |  |  |  |  |  |
| 1 cycle | 0.38 | 0.18 | 0.26 | 0.15 | 0.24 | 0.21 |
| 100 cycles | 0.38 | 0.2 | 0.35 | 0.18 | 0.19 | 0.25 |
| 1000 cycles | 0.44 | 0.23 | 0.45 | 0.25 | 0.23 | 0.27 |
| 4000 cycles | 0.52 | 0.44 | 0.46 | 0.35 | 0.3 | 0.3 |
| css dynamic frict. |  |  |  |  |  |  |
| 1 cycle | 0.48 | 0.26 | 0.34 | 0.23 | 0.3 | 0.26 |
| 100 cycles | 0.48 | 0.36 | 0.45 | 0.24 | 0.25 | 0.31 |
| 1000 cycles | 0.56 | 0.37 | 0.54 | 0.35 | 0.32 | 0.37 |
| 4000 cycles | 0.6 | 0.56 | 0.53 | 0.47 | 0.4 | 0.39 |

TABLE 8

|  | Example 58 |
|---|---|
| Printing method | Offset Gravure |
| Pad Material | Teca Green 26 |

TABLE 8-continued

|  | Example 58 |
|---|---|
| Ink | Ruco 10KK(b) |
| Pigment in Ink | Yes |
| Drying Temperature | 65 |
| Drying Time (hrs) | 16 |
| Drying Method | oven |
| Dot Spacing um | 30 |
| Dot Base Diam. um | 12 |
| % of dots present | 74 |
| ETCH |  |
| Mixture composition HF % | 0.05 |
| H2SO4 % | 0.05 |
| NH4F % |  |
| Solvent |  |
| % Solvent |  |
| Etch time min. | 3 |
| Etch Temp. deg. C. | 25 |
| Agitated Etch bath |  |
| Etch Peak Height nm | 20.55 |
| Height S.D. | 0.51 |

TABLE 9

| Printing method | Offset Gravure |
|---|---|
| Pad Material | Schmid White gp. 4:120 |
| Ink | Ruco 10KK(r) |
| Pigment in Ink | No |
| Drying Temperature | 80 |
| Drying Time (hrs) | 1 |
| Drying Method | Oven |
| Dot Spacing um | 65 |
| Dot Base Diam. um | 20 |
| % of dots present | 99 |

TABLE 10

|  | Example | | | | | | | | | | | |
|---|---|---|---|---|---|---|---|---|---|---|---|---|
|  | 59 | 60 | 61 | 62 | 63 | 64 | 65 | 66 | 67 | 68 | 69 | 70 |
| ETCH | | | | | | | | | | | | |
| Mixture composition HF % | 0.07 | | | | 0.06 | | | | 0.07 | | | |
| H2SO4 % | 0.07 | | | | 0.06 | | | | 0.07 | | | |
| NH4F % | | | | | | | | | | | | |
| Solvent | NMP | | | | NMP | | | | NMP | | | |
| % Solvent | 5 | | | | 7 | | | | 10 | | | |
| Etch time min. | 3 | 4 | 5 | 6 | 3 | 4 | 5 | 6 | 3 | 4 | 5 | 6 |
| Etch Temp. deg. C. | 25.5 | 25.5 | 25.5 | 25.5 | 25.4 | 25.4 | 25.4 | 25.4 | 25.4 | 25.4 | 25.4 | 25.4 |
| Etch Peak Height nm | 24.68 | 30.12 | 36.89 | 42.07 | 17.64 | 22.26 | 25.66 | 30.31 | 19.88 | 24.22 | 29.53 | 33 |
| Height S.D. | 0.99 | 0.72 | 2.62 | 1.9 | 1.38 | 1.57 | 1.79 | 1.3 | 1.12 | 1.94 | 1.41 | 1.89 |
| Peak Radius mm | round | more pointed | more pointed | same | | | | | | | | |

TABLE 14

Chem. strengthen after texture
Example 73

| Etch Time | P-V | S.D. |
|---|---|---|
| 6 | 19.2 | 0.7 |
| 8 | 21.2 | 1.9 |
| 10 | 25.4 | 2.6 |
| 12 | 31.3 | 3.6 |

TABLE 13

Texture on UnChem. Strengthened
Example 72

| Etch Time | P-V | S.D. |
|---|---|---|
| 6 | 16.3 | 0.9 |
| 8 | 21.3 | 0.9 |
| 10 | 27.6 | 1.7 |
| 12 | 30.4 | 3.5 |

TABLE 12

Chem. Strengthen then Texture
Example 71

| Etch Time | P-V | S.D. |
|---|---|---|
| 3 | 19.2 | 2.72 |
| 4 | 25.4 | 1.6 |
| 5 | 29.4 | 1.9 |
| 6 | 33.8 | 0.7 |

TABLE 11

| PRINTING | |
|---|---|
| Pad Material | Schmid White Gp.4 120 diam |
| Ink | Ruco 10KK(r) |
| Ink Pigment | No |
| Drying Temperature | 80 |
| Drying Time | 1 |
| Drying Method | oven |
| Dot Spacing um | 30 |
| Dot Base Diameter um | 15 |
| % dots present | 99 |

TABLE 11-continued

| ETCHING | |
| --- | --- |
| HF % | 0.05 |
| H2SO4 % | 0.05 |
| NH4F % | — |
| Solvent | |
| Solvent % | — |
| Etch Temp. deg C. | 26.5 |

What is claimed is:

1. A process comprising producing a glass substrate for use as a substrate for a thin film magnetic data storage disc, the process including the steps of:

(a) providing a glass substrate;

(b) printing a regular masking pattern comprising a pattern of printed dots onto at least a portion of the surface of the substrate;

(c) heating the printed dots so that each printed dot is circular in cross-section wherein the cross-section is taken parallel to the glass substrate surface; and (d) etching the unmasked surface of the substrate thereby to texture the substrate surface.

2. A process according to claim 1 wherein the printing step (b) is carried out by pad printing.

3. A process according to claim 1 wherein the masking pattern is formed from a resinous ink.

4. A process according to claim 1 wherein the textured surface of the substrate is composed of a regular array of peaks separated by valleys.

5. A process according to claim 4 wherein the peaks have an average height of from 0.5 to 40 nm.

6. A process according to claim 4 wherein the peaks have a base diameter of from 5 to 30 µm.

7. A process according to claim 1 wherein the etching step is selected from a wet or dry chemical etching step.

8. A process according to claim 7 wherein the chemical etchant is an aqueous solution of hydrogen fluoride.

9. A process according to claim 7 wherein the etchant contains a solvent for the ink which acts during the etching step to increase the etching of the glass substrate beneath the edges of the printed ink.

10. A process according to claim 1 wherein the textured surface extends over substantially the whole surface of the substrate.

11. A process according to claim 1 wherein the textured surface extends over only a central part of the substrate which defines a landing zone for a read/write magnetic head.

12. A process according to claim 1 wherein the textured surface has a surface roughness which is varied to define a plurality of functional zones of the substrate, the zones comprising a landing zone and a read/write zone, each zone having a desired surface roughness.

13. A process comprising producing a glass substrate for use as a substrate for a thin film magnetic data storage disc, the process including the steps of:

(a) providing a glass substrate;

(b) printing a regular masking pattern comprising a pattern of printed dots onto at least a portion of the surface of the substrate; and (c) etching the unmasked surface of the substrate thereby to texture the substrate surface.

14. A process according to claim 13 wherein the printed dots are 5 to 15 µm in diameter and have an average pitch between adjacent dots of from 5 to 100 µm.

* * * * *